(12) United States Patent
Bassan, Jr.

(10) Patent No.: US 11,019,814 B2
(45) Date of Patent: Jun. 1, 2021

(54) INSECT CONTROL SYSTEM

(71) Applicant: Morton Edward Bassan, Jr., Captain Cook, HI (US)

(72) Inventor: Morton Edward Bassan, Jr., Captain Cook, HI (US)

( * ) Notice: Subject to any disclaimer, the term of this patent is extended or adjusted under 35 U.S.C. 154(b) by 298 days.

(21) Appl. No.: 15/096,274

(22) Filed: Apr. 11, 2016

(65) Prior Publication Data

US 2016/0360740 A1 Dec. 15, 2016

Related U.S. Application Data

(63) Continuation-in-part of application No. 13/369,058, filed on Feb. 8, 2012, now Pat. No. 9,307,755.

(60) Provisional application No. 61/440,795, filed on Feb. 8, 2011.

(51) Int. Cl.
*A01M 1/02* (2006.01)
*A01N 25/00* (2006.01)
*A01M 1/20* (2006.01)

(52) U.S. Cl.
CPC ............ *A01M 1/2094* (2013.01); *A01M 1/02* (2013.01); *A01M 1/2016* (2013.01); *A01N 25/006* (2013.01)

(58) Field of Classification Search
None
See application file for complete search history.

(56) References Cited

PUBLICATIONS

Pierre, Economic Impact of a Mediterranean Fruit Fly Outbreak in Florida, University of Florida, pp. 1-157. (Year: 2007).*

* cited by examiner

*Primary Examiner* — Celeste A Roney
(74) *Attorney, Agent, or Firm* — Michael D. Eisenberg

(57) ABSTRACT

A system for controlling insects, comprising a first lure module for attracting insects to eat a toxicant and a second cooling module for lowing environmental temperature to a temperature lethal to insects but above the ice crystallization of fruit. The lure comprises: wax; oil; ethyl methyl eugenol or other suitable attractant; and spinosad or other suitable toxicant.

6 Claims, 11 Drawing Sheets

LURE MODULE 15

| Substance | Amount (by weight) |
|-----------|-------------------|
| Wax | 67.8 |
| Oil | 82.8 |
| EME | 12.0 |
| Spinosad | 8.00 |

COOLING MODULE 20

```
┌─────────────────────────────────────────────────────────────────────┐
│  PLACE A LURE IN PROXIMITY TO FRUIT, THE LURE COMPRISING: WAX; OIL; │
│           ETHYL METHYL EUGENOL; AND SPINOSAD 205                    │
└─────────────────────────────────────────────────────────────────────┘
                                  │
                                  ▼
┌─────────────────────────────────────────────────────────────────────┐
│         PLACE THE FRUIT IN A CLOSED REFRIGERATED COMPARTMENT 210    │
└─────────────────────────────────────────────────────────────────────┘
                                  │
                                  ▼
┌─────────────────────────────────────────────────────────────────────┐
│              MEASURE THE SOLUBLE SOLIDS IN THE FRUIT 215            │
└─────────────────────────────────────────────────────────────────────┘
                                  │
                                  ▼
┌─────────────────────────────────────────────────────────────────────┐
│   COMPUTE THE RELATIVE FREEZING POINT OF THE FRUIT WHERE ICE        │
│              CRYSTALLIZATION WILL OCCUR 220                         │
└─────────────────────────────────────────────────────────────────────┘
                                  │
                                  ▼
┌─────────────────────────────────────────────────────────────────────┐
│ SLOWLY ACCLIMATIZE THE FRUIT TO AT OR BELOW THE TEMPERATURE         │
│ LETHAL TO TEPHRITID FRUIT FLIES BY SLOWLY CHANGING THE              │
│                    TEMPERATURE 225                                  │
└─────────────────────────────────────────────────────────────────────┘
                                  │
                                  ▼
┌─────────────────────────────────────────────────────────────────────┐
│ COOL THE FRUIT DOWN TO A CORE TEMPERATURE THAT IS ABOVE THE         │
│ ICE CRYSTALLIZATION TEMPERATURE, BUT BELOW THE FREEZING POINT       │
│         OF WATER, FOR ABOUT 31-36 HOURS 230                         │
└─────────────────────────────────────────────────────────────────────┘
                                  │
                                  ▼
┌─────────────────────────────────────────────────────────────────────┐
│ SLOWLY ACCLIMATIZE THE FRUIT BY WARMING IT UP TO A SHIPPING         │
│                    TEMPERATURE 235                                  │
└─────────────────────────────────────────────────────────────────────┘
```

*Fig. 2*

INSECT CONTROL SYSTEM

CROSS-REFERENCES TO RELATED APPLICATIONS

The present application is a continuation of part of U.S. application Ser. No. 13/369,058, filed Feb. 8, 2012 now U.S. Pat. No. 9,307,755, issued Apr. 12, 2016 which claims priority from U.S. Provisional Application Ser. No. 61/440, 795 filed on Feb. 8, 2011, which are each incorporated herein by reference in their respective entirety.

TECHNICAL FIELD

The present invention, in some embodiments thereof, relates to a pest control system, particularly tephritid fruit flies.

BACKGROUND OF THE INVENTION

Insects pose a serious problem in growing, storing and transporting fresh fruit. The present invention is an improvement on current methods for controlling fruit flies in the presence of fruit. Some embodiments relate to controlling tephritid fruit flies.

BRIEF SUMMARY OF EMBODIMENTS OF THE INVENTION (1) The present invention relates to system for controlling insects. In a variant, a lure for attracting insects, comprises: wax; oil; ethyl methyl eugenol; and spinosad.

(2) In another variant of the insect lure, the wax comprises bee's wax and the oil comprises mineral oil.

(3) In a further variant of the insect lure, wherein the lure comprises: a ratio of wax to oil by weight of about 0.8188 to 1.0; a ratio of Spinosad to oil by weight of 0.0966 to 1.0; and 1 milliliter of ethyl methyl eugenol per 5.65 grams of wax.

(4) In still another variant of the insect lure, the lure comprises: a ratio of wax to oil by weight from about 0.7711:1.0 to about 0.8694:1.0; a ratio of Spinosad to oil by weight from about 0.0909:1.0 to about 0.1026:1.0 and a ratio of ethyl methyl eugenol to wax of about 1 milliliter of ethyl methyl eugenol per 5.32 grams of wax to about 1 milliliter of ethyl methyl eugenol per 6.00 grams of wax;

(5) In yet a further variant of the insect lure, the lure comprises: about 36.4% of wax by weight; about 44.4% of oil by weight; about 10.3% of ethyl methyl eugenol by weight; and about 7.7% of Spinosad by weight.

(6) In another variant of the insect lure, the lure comprises about 0.12% of 1-OCTEN-3-OL by weight.

(7) In a further variant, a system for eliminating insects comprises: an insect lure of any of the preceding and a cooling system configured to cool environmental air temperature to a range below a temperature lethal to insects and above the ice crystallization temperature of a fruit.

(8) In still another variant of the system for eliminating insects, the cooling system is configured to cool environmental temperature below the freezing point of water but above the ice crystallization temperature of a fruit.

(9) In yet a further variant, a method of eliminating insects from fruit, comprises: placing a lure in proximity to the fruit, the lure comprising: wax; oil; ethyl methyl eugenol; and spinosad; placing the fruit in a closed refrigerated compartment, without the lure; cooling the air temperature in the compartment to inside a range below a temperature lethal to insects and above the ice crystallization temperature of a fruit.

(10) In another variant, the method of eliminating insects from fruit comprises: measuring the soluble solids in the fruit; computing the relative freezing point of the fruit where ice crystallization will occur; slowly acclimatizing the fruit to at or below the temperature lethal to insects by slowly changing the temperature; cooling the fruit down to a core temperature that is above the ice crystallization temperature, but below the freezing point of water, for about 31-36 hours or optionally, the time period required for a-yet-to-be-USDA-APHIS approved sub-freezing quarantine protocol and slowly acclimatizing the fruit by warming it up to a shipping temperature.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIG. 2 is a flow chart of a method of controlling insects.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

The present invention may be employed to control insects by selecting the proper lure mixed with a wax and a wax thinning agent and the proper toxicant. Insects may include insects tephritid fruit flies, yellow jackets and cockroaches for example.

Figures 1, 1A, 1B:
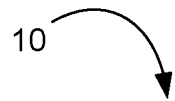
FIG. 1 is a block diagram of an insect fly control system.

The present invention is directed toward an insect control system 10. In one variant, referring to FIG. 1, the control system 10 comprises two modules. A first module is a lure system 15. The lure system may comprise natural bees' wax (optionally organic bees' wax) mixed with a human laxative mineral oil. The mineral oil makes the wax more pliable and easier for an insect to eat by thinning the bees' wax. The lure system also includes an insect pheromone and toxicant. Optionally, oil may be omitted from the lure. Optionally, other oil suitable for softening wax for insect mandibles to pierce and eat may be employed.

Any wax is suitable that is reasonably hard at room temperature and can be softened by incorporating mineral oil. Ambient air temperature coupled with how much the wax is thinned can be used to control the volatilization of the pheromone and toxicant and also allow the target insect's mandibles to pierce into the softened wax. When a target insect's mandibles pierce into the softened wax, that action opens a new little bubble of lure/toxicant to become even more attractive and toxic.

Of importance is to make sure that the waxy mixture becomes softened for the insect's mouth parts, while the melting temperature of the mixture is high enough to prevent melting from environmental factors like sun, heat and rain.

Using organic bee's wax allows the lure to be fully USDA certified organic.

Bees' wax (which melts at about 145° F.) combined with mineral oil forms a pliable mixture to makes the pheromone/toxicant less susceptible to rain and sun that normally causes rapid volatilization with rapid attraction and toxicity deterioration. In one variant, an electric whisk/beater is optionally used to beat as much air into the mixture as possible to make it easier for an insect's mandibles to pierce into the mixture, also causing new surface area to be created for controlled volatilization of the pheromones and flash toxicant.

In one example, to make 3,335.61 total lure mixture, 1213.80 grams bees' wax, 1482.34 grams mineral oil, 383.68 ml ethyl methyl eugenol (pheromone), and 255 grams 22.8% spinosad (organic fermented excretion toxicant) are combined.

In one variant, components for a *Bactrocera* (previously known as genus "*Dacus*") *dorsalis* (Oriental fruit fly) lure comprise:

| | | |
|---|---|---|
| 1. | bee's wax, by weight | 36.4% |
| 2. | mineral oil, by weight | 44.4% |
| 3. | ethyl methyl eugenol also known as methyl eugenol or lure, by weight | 11.5% |
| 4. | spinosad, by weight | 7.7% |

These proportions can be varied, to approximately these percentages.

In a variant, the lure may be formed as follows. In a double boiler barely melt the wax. In a separate jar mix the lure with spinosad, watching the miscibility. As the wax melts add the mineral oil with an electric whisk type tool and mix very well beating in as much air as possible. As the mixture cools, notice a semi-hardening. As the wax/oil mixture is in the soft but hardening stage add the lure/spinosad whipping all ingredients together beating in as much air as possible. Keep beating until the mixture is too hard for your whisk to beat any more. Make sure that the whisk is moved all around to make the lure as homogenous as possible. Whisking and beating prevents premature volatilization of the mixture, allowing for a contaminated insects to carry it long enough to contaminate other insects that have not yet been contaminated. Let the mixture sit still until it settles which takes 12 to 24 hours. The finished lure should be a semi-solid compound that is light and fluffy, sticky, pliable, and rainproof. This is to allow for easy transmission from one insects to another.

Other lures or lure combinations for other insets may be prepared utilizing the principles of the invention. For example, methyl eugenol also attracts *Dacus zonatus* which is another serious insect to be controlled by the present lure system.

The following table 1 illustrates four example lure mixtures generated.

TABLE 1

| Date | ml QTY | Bee's Wax | Mineral Oil | EME | 22.80% Spinosad |
|---|---|---|---|---|---|
| Friday Aug. 6, 2010 | 1 | 170.60 | 67.80 | 82.80 | 12.00 | 8.00 |
| Saturday Aug. 7, 2010 | 2 | 483.12 | 192.00 | 234.48 | 33.98 | 22.65 |
| Wednesday Aug. 11, 2010 | 3 | 1276.29 | 454.00 | 554.44 | 160.71 | 107.14 |
| Saturday Aug. 14, 2010 | 4 | 1405.60 | 500.00 | 610.62 | 176.99 | 117.99 |
| | 5 | | | | | |
| Totals | 23 | 3335.61 | 1213.80 | 1482.34 | 383.68 | 255.79 |
| Costs | | | $ 29.87 | $ 8.02 | $ 6.64 | $ 15.20 |

In a second module 20, a cooling system is provided for eradicating insects from fruit. Fruit is isolated and kept isolated during a cooling system process, either with screening fine enough to exclude insects from re-infesting the fruit or in a sealed refrigerator type ocean going container or in a sealed refrigerated type building. If the cooling is done in a refrigerated shipping container then the doors would simply be sealed. If the cooling is done in a refrigerated type building then screening between the building's doorway and a sealable refrigerator type shipping container is placed in such a way to ensure that no insects could re-infest the fruit.

In a variant, referring to FIG. 2, the process comprises the following steps: Placing 205 a lure comprising: wax; oil; ethyl methyl eugenol; and Spinosad in proximity to fruit growing in a farm, orchard, vineyard or ranch area, and placing 210 the fruit in a closed refrigerated compartment, without necessarily a lure.

In a step 215, measuring the soluble solids in the fruit. In addition, the total dissolved solids may be measured. Then, in a step 220, the relative freezing point of the fruit where ice crystallization will occur is computed.

In a step 225, slowly acclimatize the fruit to chill by slowly changing the temperature.

In a step 230, cooling the fruit down to a core temperature that is above the ice crystallization temperature, but below the freezing point of water, for about 31-36 hours or optionally the time period required for a-yet-to-be-USDA-APHIS approved sub-freezing quarantine protocol.

In a step 235, slowly acclimatize the fruit by warming it up to shipping temperature, which may be 34-40 degrees Fahrenheit, similarly as in the cooling process.

Figure 3:
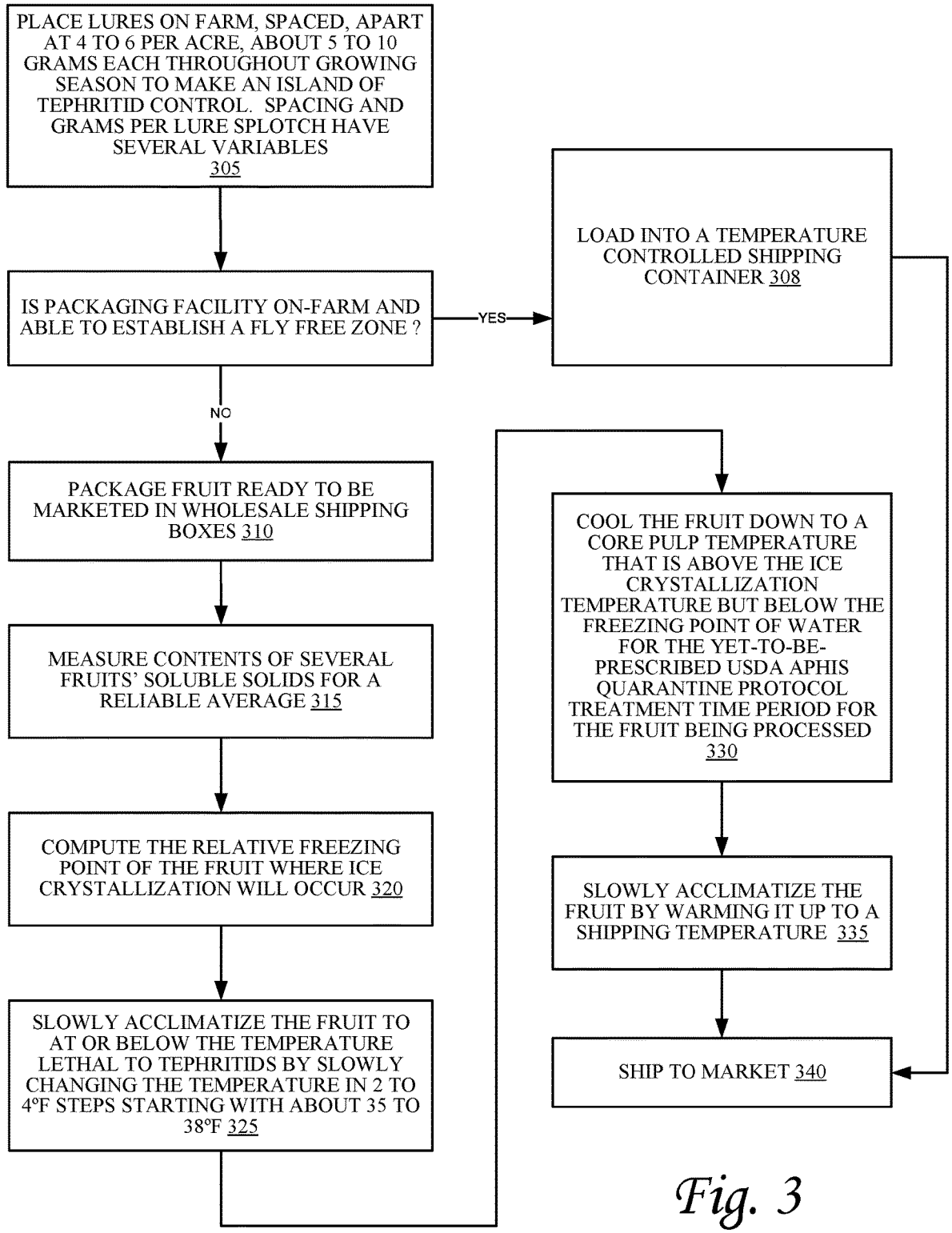
FIG. 3 is a flow chart of a process of eradicating fruit flies.

In another variant, referring to FIG. 3, the process of eradicating fruit flies comprises the following steps: Placing 305 lures on farm ranch, vineyard, orchard, or similar area, well spaced, and at 4 to 6 per acre, and about 5 to 10 grams each throughout the growing season to make an island of insect control. Spacing and grams per lure splotch have several variables. If the fruit packaging facility is on-farm and are able to establish a fly free zone similar to Florida's Caribbean fly free zone then one may not need the subfreezing protocol, proceed to step 308, otherwise proceed below to step 310. In a step, load 308 into a temperature controlled shipping container such as a sealed refrigerated ocean or truck type container that precludes insect reinfestation. Then ship to market 340.

Figure 14:
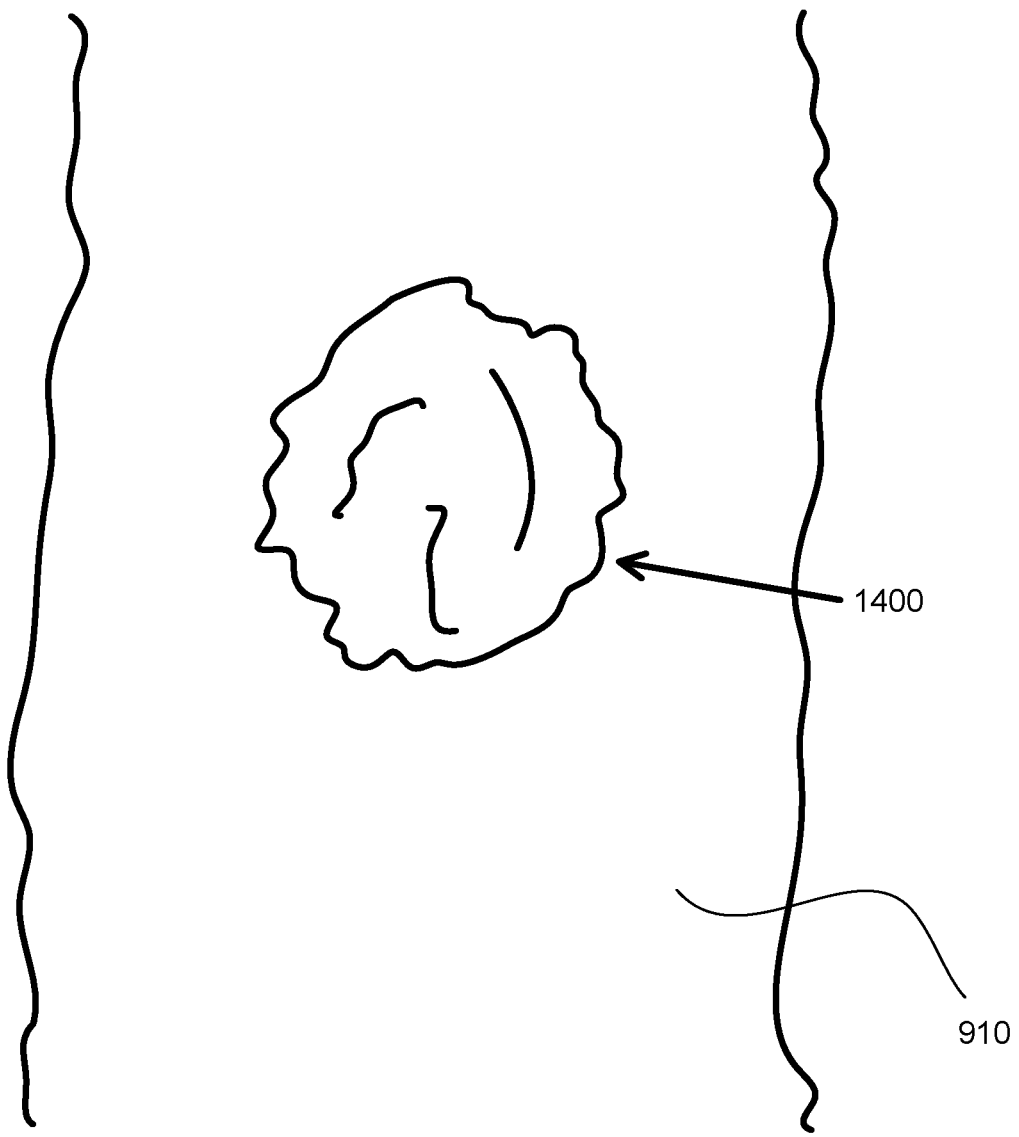
FIG. 14 an example application of lure on an object.

Package 310 fruit ready to be marketed in wholesale shipping boxes see e.g. FIG. 14. Measure 315 several fruit's soluble solid's contents for a reliable average. Compute 320 the relative freezing point of the fruit where ice crystallization will occur. Slowly acclimatize 325 the fruit to at or below the temperature lethal to insects by slowly changing the temperature in 2 to 4° F. steps starting with about 35 to 38° F. Cool 330 the fruit down to a core pulp temperature that is above the ice crystallization temperature but below the freezing point of water for the yet-to-be-prescribed USDA APHIS quarantine protocol treatment time period for the fruit being processed. Slowly acclimatize 335 the fruit by warming it up to a shipping temperature. Ship 340 to market.

For high brix produce in 24 to 48 hours, or optionally the time period required for a-yet-to-be-USDA-APHIS approved sub-freezing quarantine protocol, after attaining 26 to 31.5 degrees core temperature to be able to ship produce to otherwise prohibited quarantined markets. Currently approved cooling systems require 14 or 15 days at 34 degrees, which means there will be considerable fruit breakdown (also known as rotting) at destination. The present cooling treatment system will not work for low brix agricultural crops such as lettuce or zucchini.

In another variant, the system cools the ambient air to between 26 degrees F. and 32 degrees F.

In another variant, the Fruit Fly lure the comprises the following components for a *Bactrocera* (previously known as genus "*Dacus*") *dorsalis* (Oriental fruit fly) lure:

| | | |
|---|---|---|
| 1. | bee's wax, by weight | 36.4% |
| 2. | mineral oil, by weight | 44.4% |
| 3. | ethyl methyl eugenol also known as methyl eugenol or lure, by weight | 10.3% |
| 4. | 1-octen-3-ol | 0.12% |
| 5. | spinosad, by weight | 7.7% |

These proportions can be varied about the number presented here.

In a variant, a lure for attracting insects comprises: a wax; a wax thinning agent; a chemical lure; and a toxicant for insects. Optionally, the wax thinning agent is methyl eugenol. In another variant, the wax thinning agent is basil oil. In further variant, the lure comprises: a ratio of wax to wax thinning agent by weight of about 0.8188 to 1.0; a ratio of toxicant to wax thinning agent by weight of 0.0966 to 1.0; and 1 milliliter of toxicant per 5.65 grams of wax.

A method of manufacturing lure comprises: In a double boiler barely melt the wax. In a separate jar mix the lure's attractant with spinosad watching the miscibility. As the wax melts add the mineral oil with an electric whisk/beater type tool and mix very well beating in as much air as possible. As the mixture cools notice a semi-hardening.

As the wax/oil mixture is in the soft but hardening stage add the lure/Spinosad whipping all ingredients together beating in as much air as possible. Keep beating until the mixture is too hard the whisk. Ensure that the whisk is moved all around to make the lure is as homogenous as possible. Whisking and beating prevents premature volatilization of the mixture, allowing for a contaminated insects to carry it long enough to contaminate other insects that have not yet been contaminated. Let the mixture sit until it settles which takes 12 to 24 hours. The finished lure should be a semi-solid compound that is light and fluffy, sticky, pliable, and rainproof. This is to allow for easy transmission from one insects to another.

There exists other lures, pheromones, or lure combinations for other insects. Methyl eugenol also attracts *Dacus zonatus* which is another serious insect to be controlled by our lure system. Trimedlure attracts the Mediterranean fruit fly with capilure acting something like an extender for Trimedlure. Ceratitislure is generally for *Ceratitis cosyra*, Questlure is for *Ceratitus rosa* as well as *C. captita* and *C. cosyra*. The ability of this base to control the volatilization of these various insect lures and toxicants is the overriding benefit of this invention which can be combined with a variety of lures/pheromones for targeted pest control.

1-OCTEN-3-OL may attract mosquitoes which can also be incorporated into the base.

The lure/cooling system with various pheromones should control and allow new agricultural markets for areas with the following insects:
 1. *Ceratitis* fruit flies
 2. (*Ceratitis capitata*) ("medfly")
 3. *Ceratitis rosa*
 4. *Anastrepha* fruit flies
 5. *Anastrepha fraterculus*
 6. *A. suspensa* in Florida 7. Mexican fruit fly (*A. ludens*)
8. Caribbean fruit fly (*A. suspensa*)
9. Mexican fruit fly and the West Indian fruit fly (*A. oblique*)
10. South American fruit fly (*A. fraterculus*)
11. *Bactrocera* fruit flies
12. melon fruit fly (*B. cucurbitae*)
13. Queensland fruit fly, *B. tryoni*
14. Oriental fruit fly (*B. dorsalis*)
15. guava fruit fly (*B. correcta*)
16. Philippines (*B. philippinensis*)
17. olive fruit fly (*B. oleae*) Bactrocera oleae (Gmelin)
18. Other species that presently assigned to the *Dacus* genus that in the future may be reassigned to the genus *Bactrocera* or other genera, may also be controlled by the system of the present invention.

A novelty of the lure system of the present invention is to control volatilization of lure/toxicant, rain or shine, and that the pests see it as a food, eating it along with the toxicant and exposing new lure/toxicant while eating, killing that pest and preparing a location for the attraction of the next pest. Below is a partial list of insects that can be controlled with this system in Table 2.

TABLE 2

| Pest | Common Name | Lure | Male | Female | Both Sexes |
|---|---|---|---|---|---|
| *A. suspensa* | Caribbean fruit fly | Protein yeast type baits** | | | X |
| *A. suspensa* | Caribbean fruit fly | 2 component fruit fly lure | | | X |
| *A. suspensa* | Caribbean fruit fly | Protein yeast type baits** | | | X |
| *A. ludens* | Mexican fruit fly | 2 component fruit fly lure or protein** | | | X |
| *A. ludens* | Mexican fruit fly | Protein yeast type baits** | | | X |
| *A. obliqua* | West Indian fruit fly | 9 component fruit fly lure | | | X |
| *A. obliqua* | West Indian fruit fly | Protein yeast type baits** | | | X |
| *A. striata* | Guava fruit fly | Protein yeast type baits** | | | X |
| *A. fraterculus* | South American fruit fly | Protein yeast type baits** | | | X |
| *A. serpentina* | Sapote fruit fly | 2 component fruit fly lure | | | X |
| *A. serpentina* | Sapote fruit fly | Protein yeast type baits** | | | X |
| *A. distincta* | South American fruit fly | 2 component fruit fly lure | | | X |
| *A. distincta* | South American fruit fly | Protein yeast type baits** | | | X |
| *B. cacuminata* | Wild tobacco fly, Solanum fruit fly | Methyl Eugenol AKA EME | X | | |
| *B. cucumis* | Cucumber fly | Protein yeast type baits** | | | X |
| *B. cucurbitae* | Melon fly | Cuelure | X | | |
| *B. dorsalis* | Oriental fruit fly | Methyl Eugenol AKA EME | X | | |
| *B. frauenfeldi* | Mango fruit fly | Cuelure | X | | |
| *B. invadens* | Asian fruit fly, Mouche des fruits | Methyl Eugenol AKA EME | X | | |
| *B. jarvisi* | Jarvis' fruit fly | Cuelure | X | | |
| *B. jarvisi* | Jarvis' fruit fly | Cuelure, protein baits** | | | X |
| *B. latifrons* | Malaysian fruit fly | Protein yeast type baits** | | | X |
| *B. latifrons* | Malaysian fruit fly | Alpha-ionol & cade oil | X | | |
| *B. musae* | Banana fly | Methyl Eugenol AKA EME | X | | |
| *B. neohumeralis* | Lesser Queensland fruit fly | Cuelure | X | | |
| *B. newmanii* | Newman fly | Cuelure | X | | |
| *B. oleae* | Olive fruit fly | spirochetal | X | | |
| *B. opiliae* | sibling species to *B. dorsalis* | Methyl Eugenol AKA EME | X | | |
| *B. papayae* | Papaya fruit fly | Methyl Eugenol AKA EME | X | | |
| *B. tyroni* | Queensland fruit fly | Cuelure | X | | |
| *B. zonata* | Peach fruit fly, Guava fruit fly | Methyl Eugenol AKA EME | X | | |
| *C. capitata* | Mediterranean fruit fly | Capilure | X | | |
| *C. capitata* | Mediterranean fruit fly | Trimedlure | X | | |
| *C. capitata* | Mediterranean fruit fly | Questlure | | X | |
| *C. capitata* | Mediterranean fruit fly | Ceralure | X | | |
| *C. capitata* | Mediterranean fruit fly | 3 component lure | | | X |
| *C. cosyra* | Marula fruit fly | Ceratitis Lure | X | | |
| *C. cosyra* | Marula fruit fly | Questlure | | X | |
| *C. cosyra* | Marula fruit fly | Protein yeast type baits** | | | X |
| *C. rosa* | Natal fruit fly | Questlure | | X | |
| | Mosquito | 1-Octen-3-ol | | | |
| *H. hampei* | Coffee berry borer | methanol & ethanol | | | |
| *H. hampei* | Coffee berry borer | 4 component CBB lure | | | |
| *H. hampei* | Coffee berry borer | 10 component CBB lure | | | |
| | Yellow jacket | 2,4-hexadienyl butyrate | | | |
| | Yellow jacket | Heptyl butyrate | | | |
| | Yellow jacket | octyl butyrate | | | |
| | Yellow jacket | acetic acid, isobutanol, butyl butyrate | | | |
| | Cockroach, German | Blattellaquinone, supellapyrone, | | | |
| | Cockroach, Brown banded | acetoin, seducin | | | |
| | Cockroach, smokybrown | | | | |
| | Cockroach, oriental | | | | |
| | Cockroach, American | | | | |
| | Cockroach, Turkestan | | | | |
| | Cockroach, Yamato (Japanese) | | | | |
| | Cockroach, Australian | | | | |
| | Cockroach | | | | |
| | house fly, *Musca domestica* | muscalure | | | |
| | Mosquitoes | 1-Octen-3-ol | | | |

Other lure blends include a 9 component blend—ethyl butyrate, isopropyl butyrate, hexan-1-ol, propyl butyrate, isobutyl butyrate, ethyl hexanoate, isopentyl butyrate, ethyl benzoate, and ethyl octanoate; a 2 component lure—ammonium acetate and putrescine; a 3 component type lure containing ammonium acetate, trimethylamine, and putrescine; and a Protein lure. Protein baits may include some kind of yeast like Torulla or hydrolyzed yeast such as brand name Staley's Yeast bait.

Examples of toxicants include, but are not necessarily limited to:
1. spinosad
2. malathion
3. fipronil
4. neem oi
5. pyrethrum
6. pyrethroid
7. naled.

The following toxicants were successfully incorporated into the lure base and tested:
1. malathion
2. spinosad
3. rotenone
4. pyrethrin
5. veratrine
6. osthole
7. stemonine
8. celastrus angulatus
9. Toosandanin
10. Matrine
11. basil oil.

Examples of lure attractants include, but are not necessarily limited to:
1. methyl eugenol
2. trimedlure
3. Ceralure
4. capilure
5. cuelure
6. Spiroketal
7 ammonium acetate and putrescine
8 ammonium acetate, trimethylamine, and putrescine
9. ethyl butyrate, isopropyl butyrate, hexan-1-ol, propyl butyrate, isobutyl butyrate, ethyl hexanoate, isopentyl butyrate, ethyl benzoate, and ethyl octanoate
10. questlure
11. *Ceratitis* lure
12. a protein bait attractant
13. yeast bait attractant
14. yeast hydrolysis or yeast hydrolysate
15. 1-octen-3-ol
16. methanol
17. ethanol
18. acetic acid
19. isobutanol
20. butyl butyrate
21. 2,4 hexadienyl butyrate
22. alpha-ionol
23. cade oil
24. octyl butyrate
25. methyl acetate; acetic acid ethyl ester; ethanol; 2-butanone; 3-methyl-acetic acid; 2-methylpropyl ester; 1-propanol; 2-methyl-; 3-hydroxy-2-butanone; acetic acid;
26. blattellaquinone
27. supellapyrone
28. acetoin
29. seducin
30. 2-methythiazolidine
31. 4-ethyl-guaiacol
32. 4-ethyl-2-methoxyphenol
33. 3-hydroxy-2-butanone
34. 2-methyl-2-thiazoline
35. periplanone A
36. periplanone B
37. periplanone C
38. periplanone J
39. periplanone
40. muscalure
41. methylcyclohexane
42. nonane
43. ethylbenzene
44. (R)-3-ethyl-4-methylpentanol
45. heptyl butyrate.

The following lure attractants were successfully incorporated into lure base and tested:
1. methyl eugenol
2. trimedlure
3. cuelure
4. capilure
5. 1-octen-3-ol.

The following thinning agents were successfully incorporated into wax and tested:
1. mineral oil
2. basil oil
3. methyl eugenol.

Figures 4, 5:
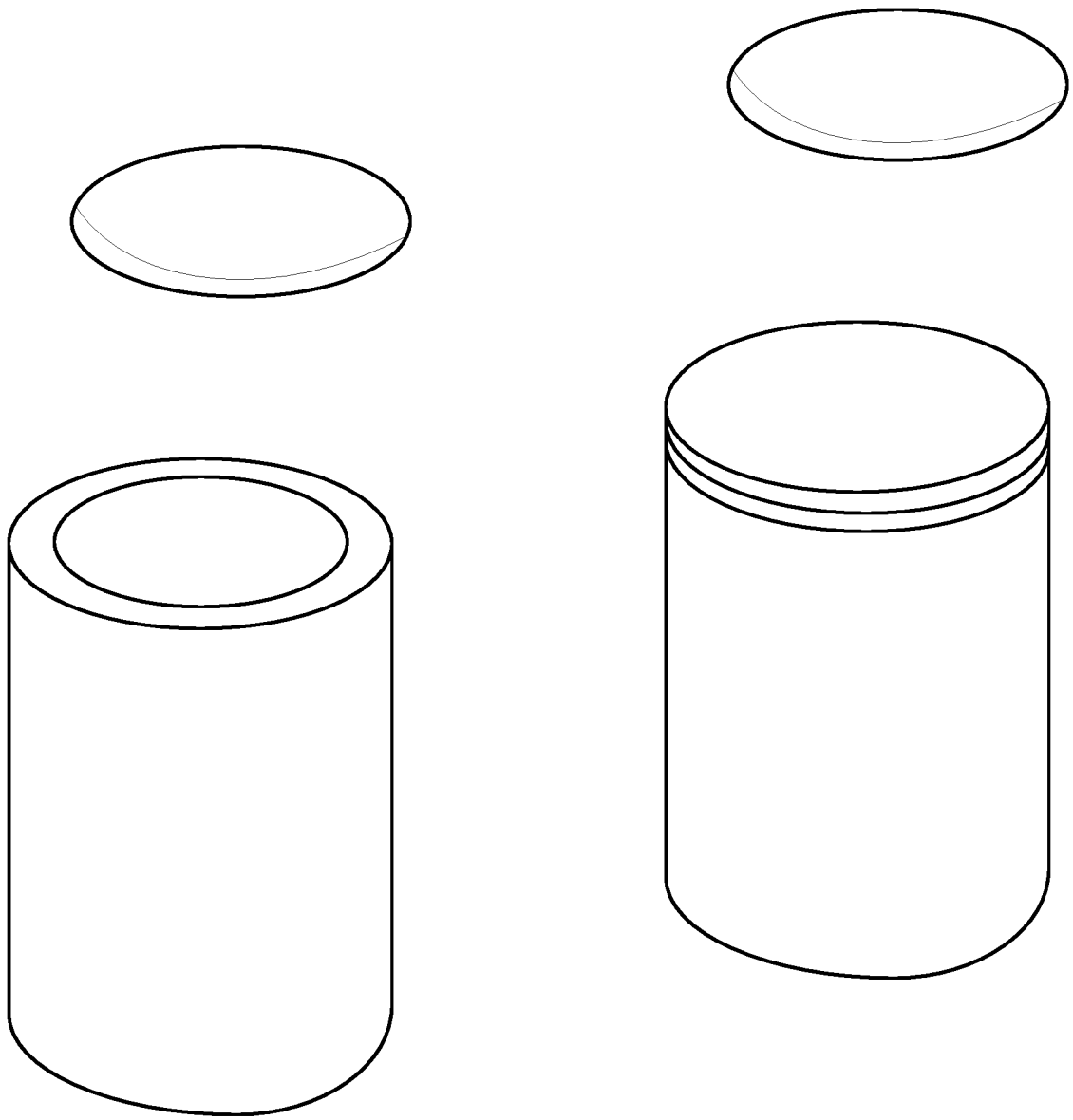
FIGS. 4 and 5 are example containers for lure.

Some substances may be in more than one class of substance, e.g. toxicant and thinner In a variant, referring to FIG. 4, containers for the lures may be tamp-on paint can 405 type 1 pint to 1 gallon sizes having tamp on lids for mating with a rim of a paint can body. Optionally, referring to FIG. 5, a threaded 55 gallon bucket 505 with threaded lid may be provided. Optional variations may have paint stick or tongue depressions may be used to spread a splotch of lure. An air powered grease gun may optionally be used to apply or shoot lure onto desired surfaces, such as, for example, telephone poles. For aerial applications, popcorn sized units of lure may be spread by airplane over large areas.

Figure 6:
FIGS. 6 and 7 are example dispensing devices for lure.
Figure 7:
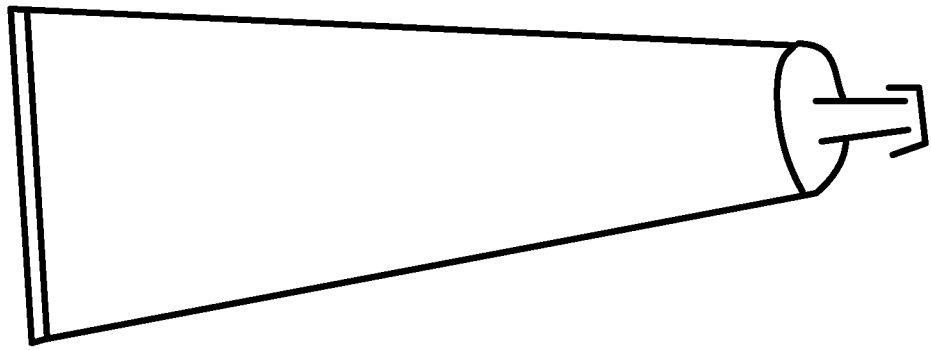

Optionally, referring to FIG. 6, caulking gun 605 type dispensers may be employed to apply lure. Optionally, referring to FIG. 7 toothpaste 705 type dispensers may be employed to apply lure.

Figure 8:
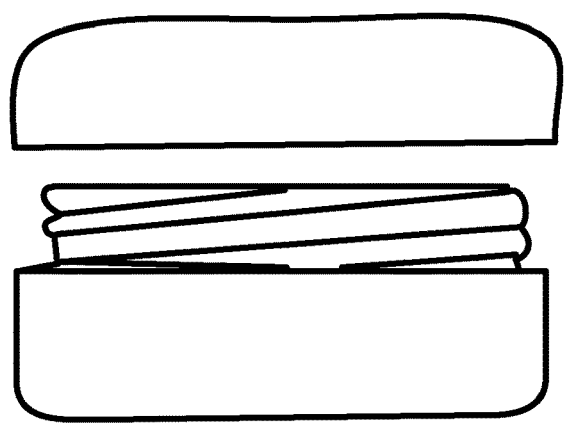
FIG. 8 is an example dispensing jar for lure.

In another variant, referring to FIG. 8, cosmetic type shallow round jars with threaded caps may optionally include double sided sticky tape or glue to affix the jar to a tree, stake in the ground, fence, building or other structure. To operate the lure, the jar is opened exposing lure and the jar is affixed to a surface.

In one example, referring to FIG. 14, lure may be placed on a tree, bush, utility pole, stake in the ground, fence post or similar structure. 5 to 10 grams of lure may be applied to the structure with a paint stick, caulking gun, tooth paste type tube, automatic grease gun to either shoot from a distance from, for example, a moving vehicle to utility poles or up close while on foot.

Figure 9:
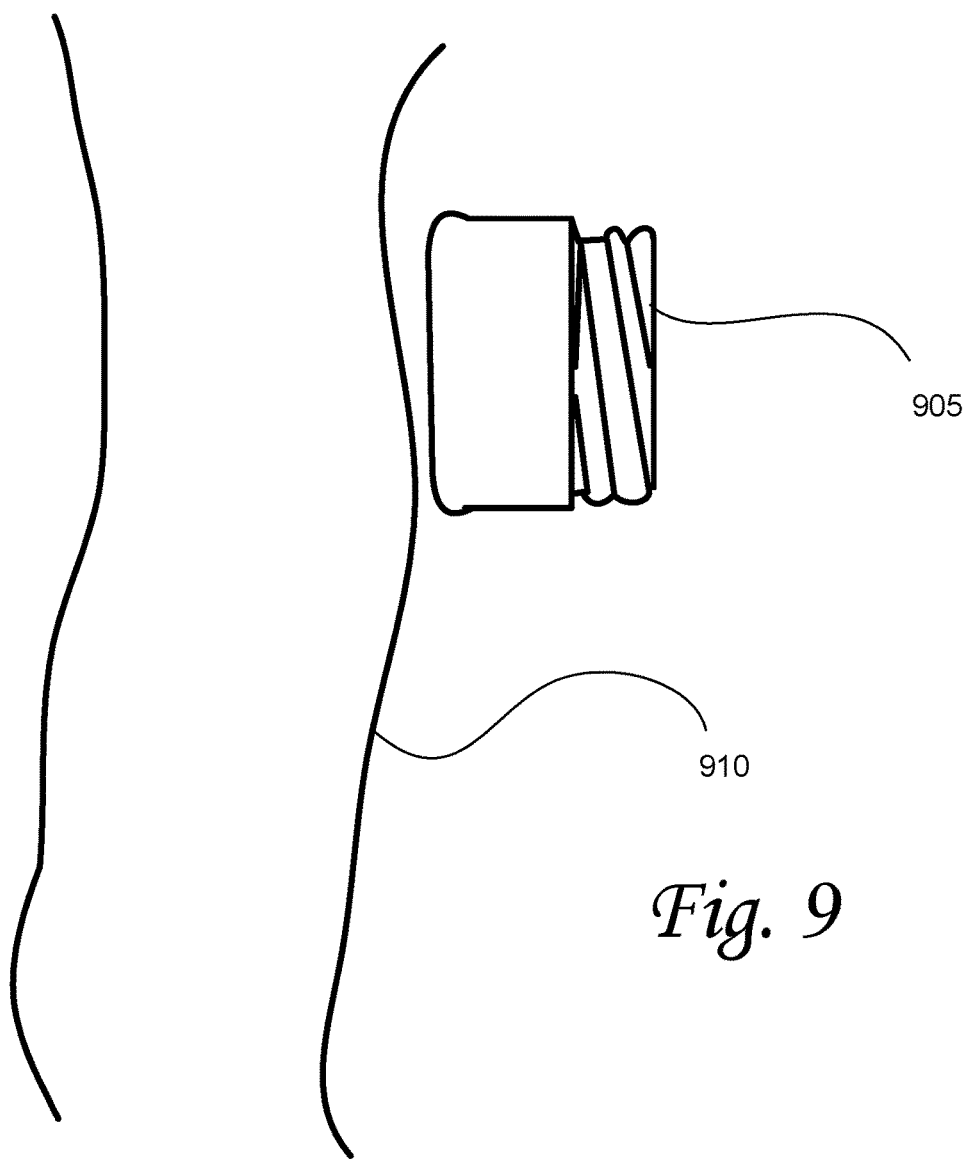
FIG. 9 is an example application of a jar of lure.

Optionally, referring to FIG. 9, the jar 905 may be placed on a tree 910 or other object. When luring fruit flies away from fruit is desired, the jar is opened, exposing the lure.

Figure 10:
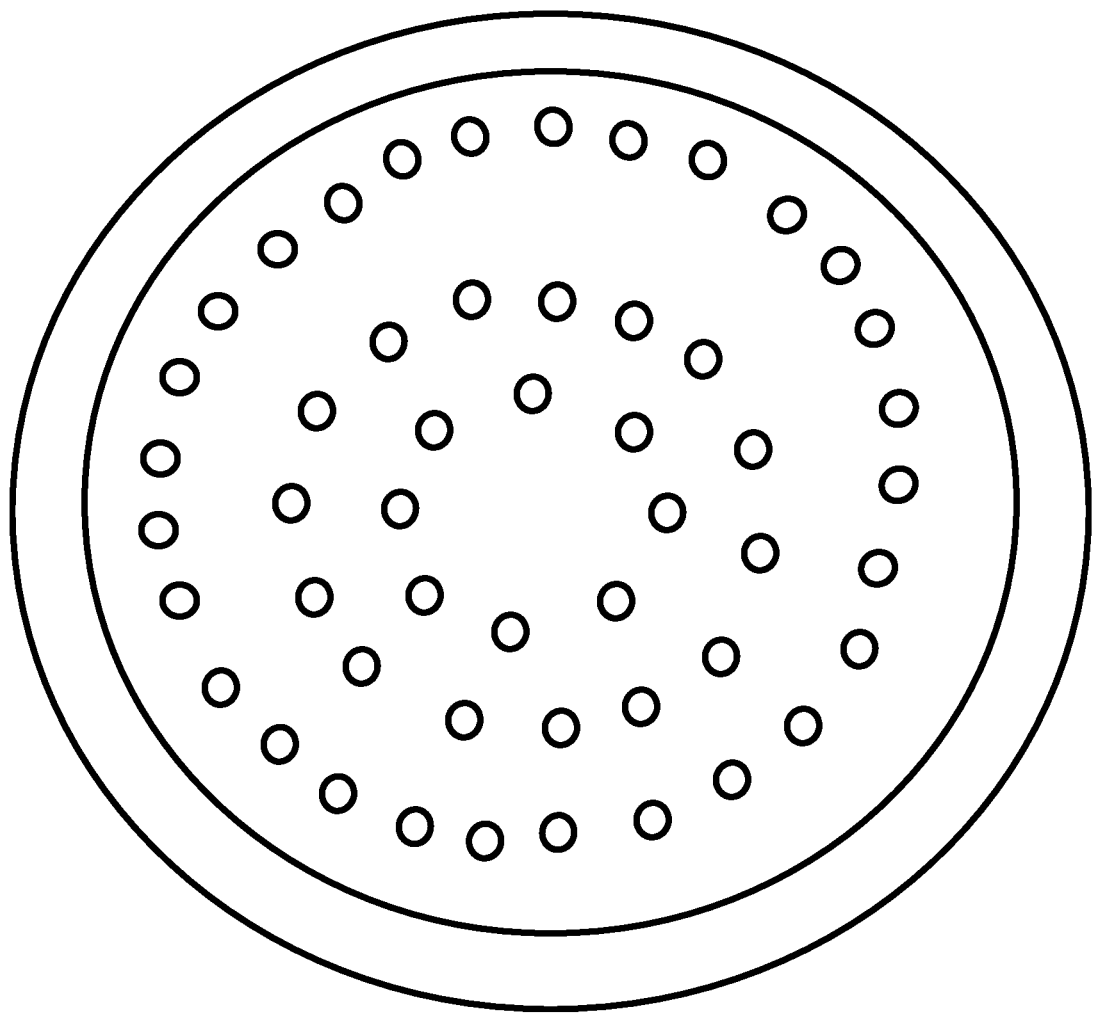
FIGS. 10 and 11 is an example die for casting the lure into usable shapes for dispersal.
Figure 11:
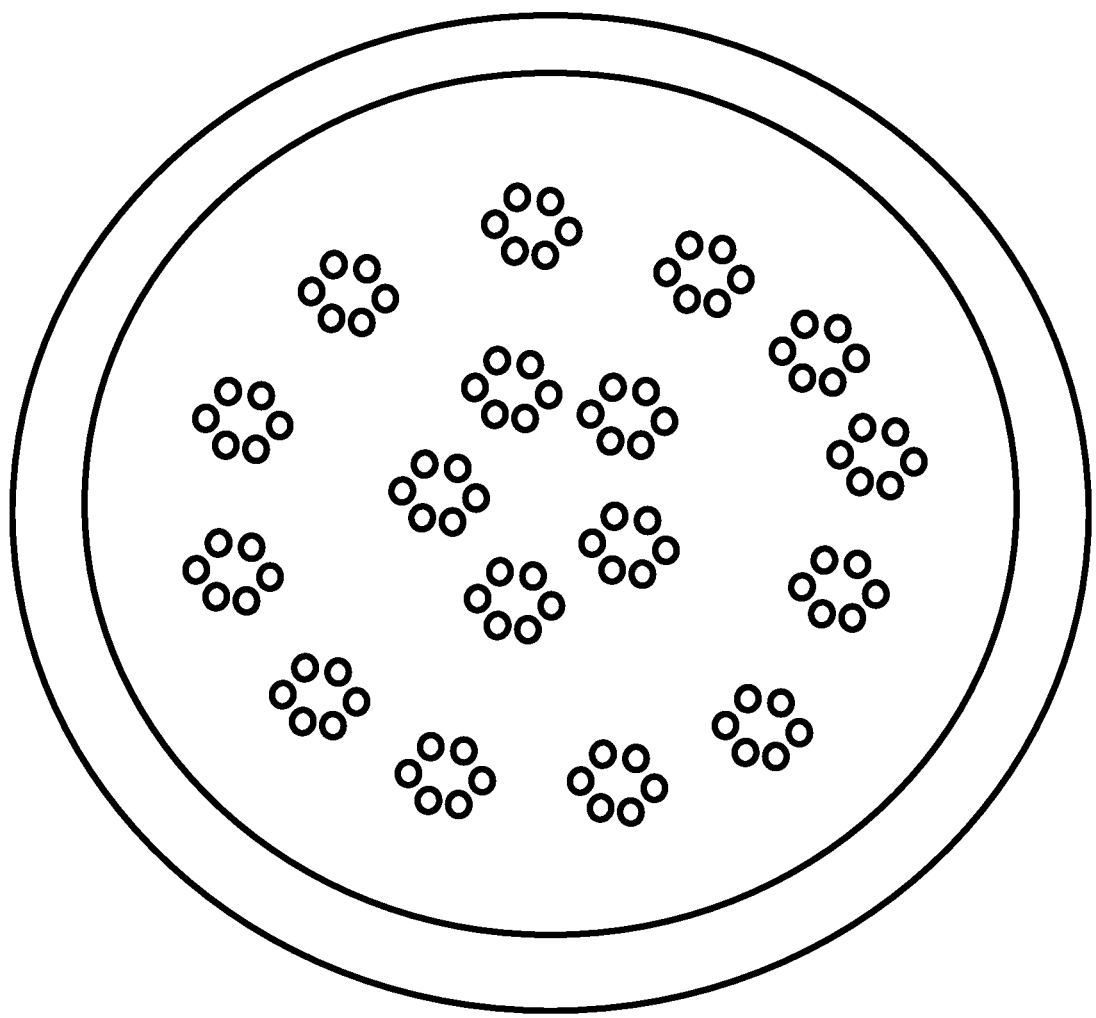
Figure 12:
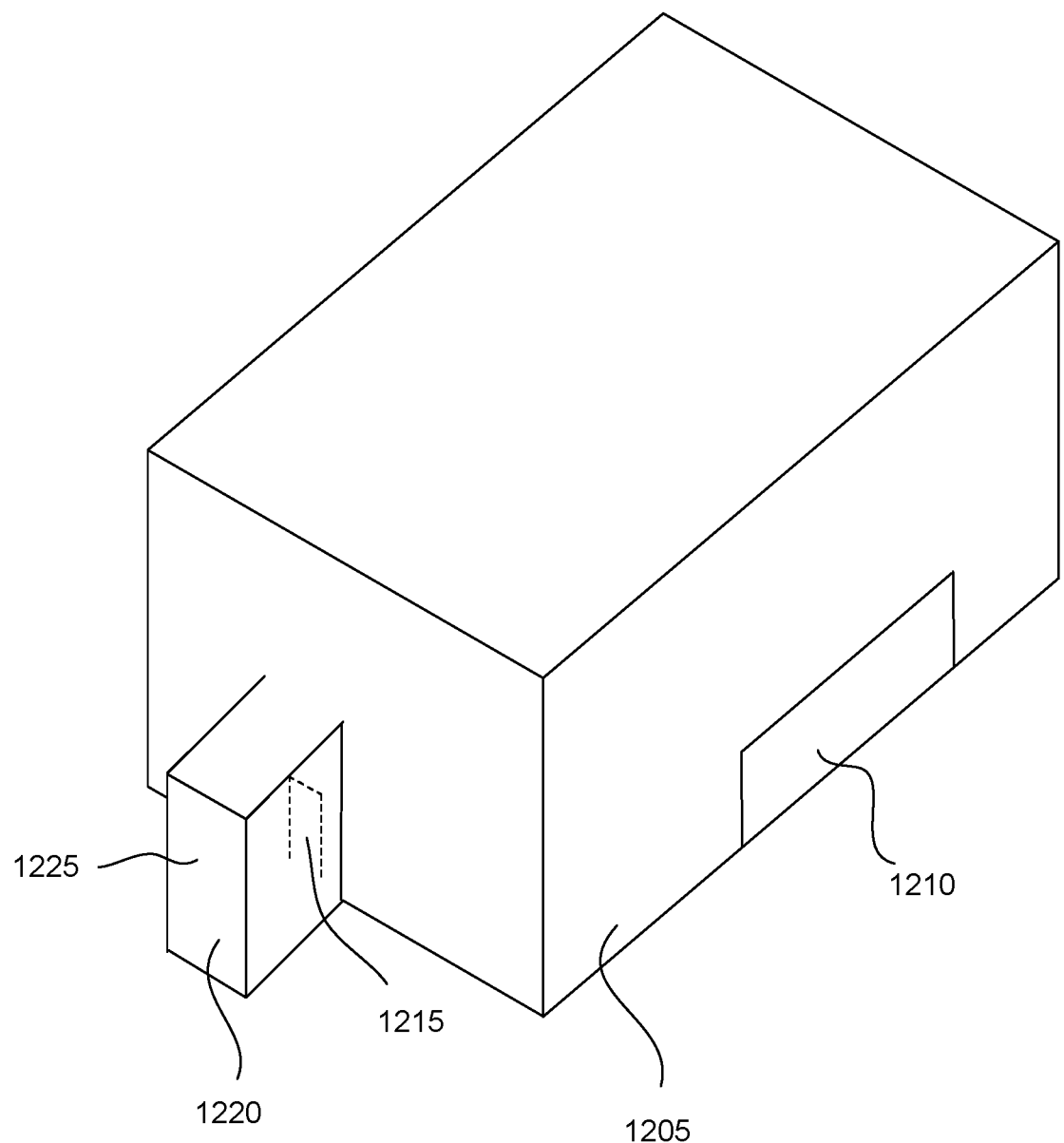
FIG. 12 is an example chill room.

In another variant, referring to FIGS. 10 and 11, dies of various hole sizes for extrusion of lure, may be employed to generate thin pieces of lure for aerial dispersal of lure. Thinner extrusions 1005 increase initial volatilization for rapid knockdown. Thicker extrusions 1105 decrease lure/toxicant vitalization for long term control.

Figure 13:
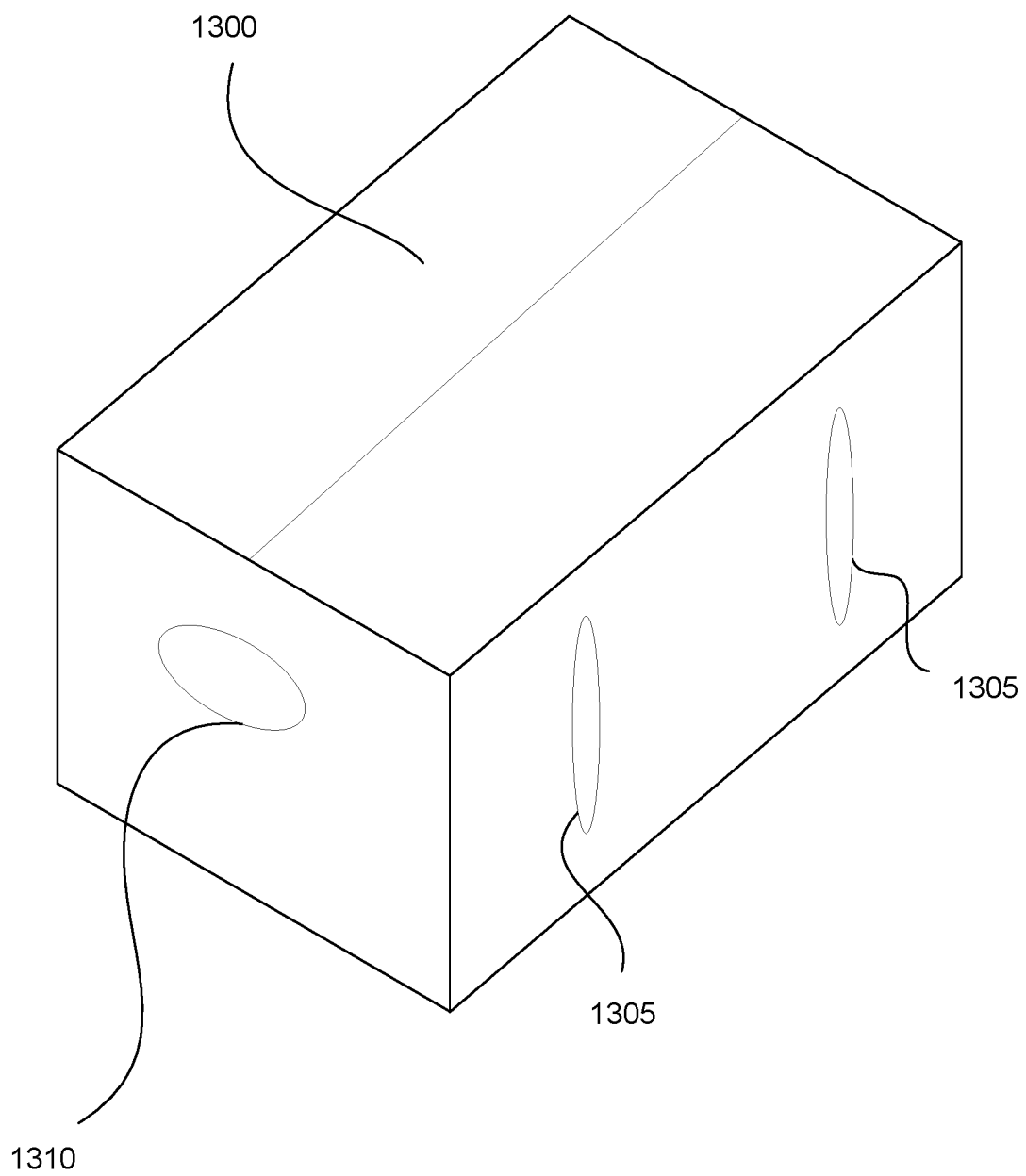
FIG. 13 illustrates an example wholesale shipping box for fruit.

In a further variant, referring to FIG. 13, a chill room 1205 has a truck door 1210 fitted with insect screening to preclude re-infestation of insects. The chill room has a double door pedestrian system 1225 having an inner door 1215 and an outer door 1220 to preclude re-infestation of insects. Refrigerated containers usually have up to four water drain holes in each corner that either need to be plugged or fitted with a duck bill type rubber one way check valve or equivalent to preclude re-infestation of insects.

FIG. 13 illustrates an example wholesale shipping box 1300 for fruit having optional air vents 1305 and an optional handle 1310.

The insect control system of the present invention has the following advantages:

The lure system base controls the volatilization in rain or shine of the both the toxicant and the pheromone.

The target insects actually see the lure as food and eats some of the lure.

When the target insect eats some of the lure then that opens up new bubbles of lure/toxicant to attract the next attracted insect.

For most insects in their mating ritual, the male feeds the female. Thus, if one uses a relatively slow acting poison then the insects feed each other the lure/toxicant, killing many more than otherwise would come to the lure. During copulation ritual intimate physical contact with a contaminated individual is another transmission vector.

The lure system is presently certified for use in organically grown farming systems.

The lure system can utilize cheaper non-organically approved toxicants.

The system has at least a four month effective life.

The cooling system uses neither chemicals nor radiation and causes no detectable damage to the fruit but kills insects to open new markets.

Rather than heat up agricultural products to kill insects and then cool the fruit rapidly which does change the crop or product and costs a lot of energy the system of the present invention cools the crop or product down at or a little below freezing. The fruits' soluble solids act as anti-freeze similar to in a car's cooling system to lower the freezing temperature.

What is claimed is:

1. A system for eliminating living tephritid fruit flies, comprising:
   a tephritid fruit fly lure, wherein the tephritid fruit fly lure comprises: a wax, oil, trimedlure, Spinosad, and air whipped into a mixture to control volatilization of Spinosad; and
   a cooling system configured to cool environmental air temperature to be below a freezing point temperature of water and above a crystallization temperature such that the environmental air temperature is acclimatized to be at or below a temperature lethal to living tephritid fruit flies.

2. The system for eliminating living tephritid fruit flies of claim 1, wherein the cooling system is configured to isolate fruit and cool the fruit to a relative freezing point of the fruit.

3. A method of eliminating living tephritid fruit flies from high brix produce from fruit, comprising:
   placing a lure in proximity to the high brix produce the fruit, the lure comprising:
      wax;
      oil;
      ethyl methyl eugenol; and
      Spinosad;
   placing the high brix produce in a closed refrigerated compartment;
   cooling to a temperature in the closed refrigerated compartment above a freezing point of water and above the ice crystallization temperature of fruit; and
   thereby preventing or reducing rotting of the high brix produce.

4. The method of claim 3, further comprising:
   measuring the soluble solids in fruit;
   computing the relative freezing point of the fruit where ice crystallization occurs;
   slowly acclimatizing the fruit to at or below a temperature lethal to tephritid fruit flies by slowly changing the temperature in the closed refrigerated compartment;
   cooling the fruit down to a core temperature that is above the ice crystallization temperature, but below the freezing point of water, for about 31-36 hours; and
   slowly acclimatizing the fruit by warming it up to a shipping temperature.

5. The method of claim 1, wherein environmental air temperature is between 26 degrees F. and 32 degrees F.

6. The method of claim 4, wherein the core temperature is between 26 degrees F. and 31.5 degrees F.

* * * * *